Figure 1:
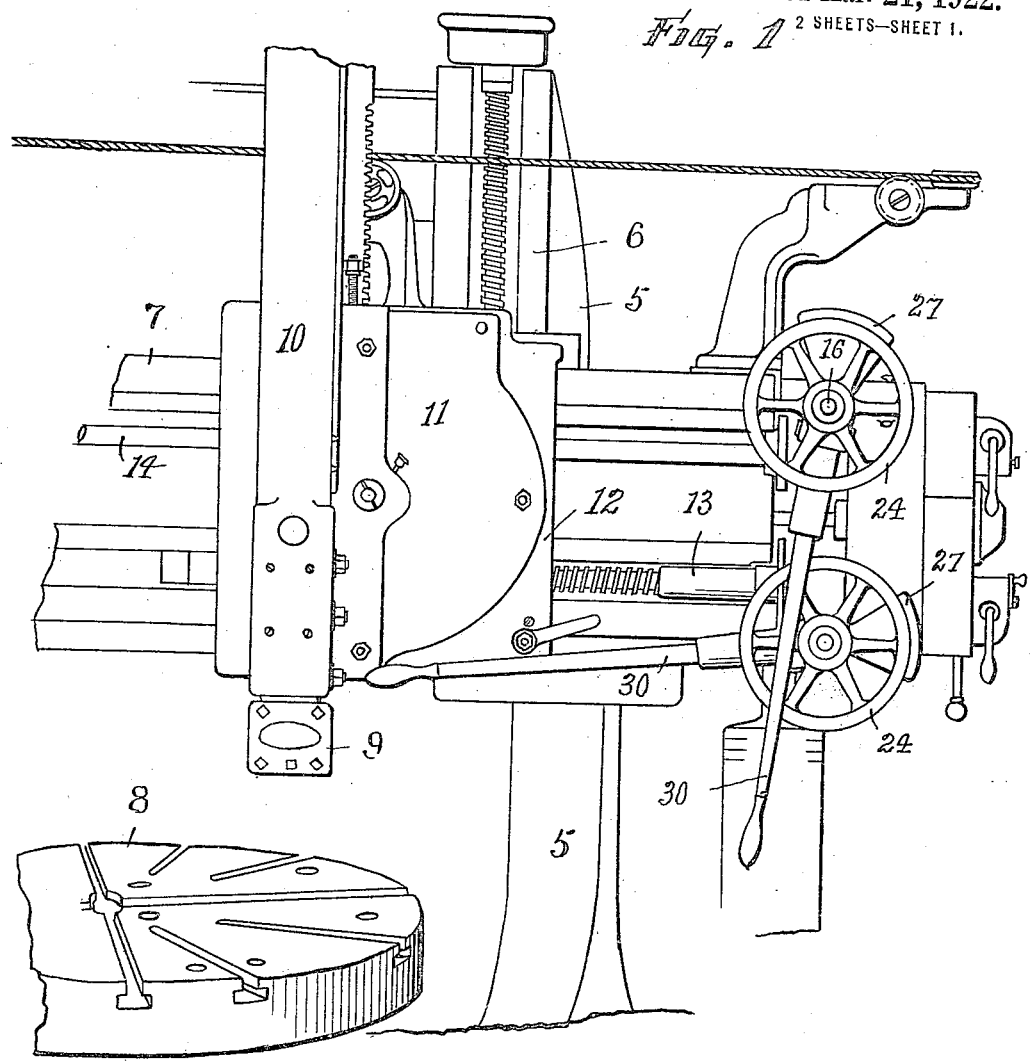

E. P. BULLARD, Jr.
HAND OPERATING MEANS FOR BORING MILLS.
APPLICATION FILED JUNE 3, 1920.

1,410,450.

Patented Mar. 21, 1922.

2 SHEETS—SHEET 1.

INVENTOR
Edward P. Bullard, Jr.
Chamberlain & Newman
ATTORNEYS

E. P. BULLARD, Jr.
HAND OPERATING MEANS FOR BORING MILLS.
APPLICATION FILED JUNE 3, 1920.
1,410,450.
Patented Mar. 21, 1922.
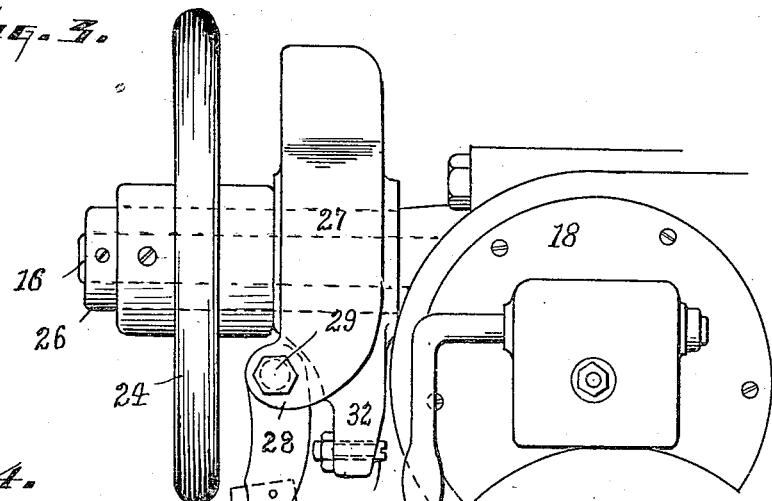
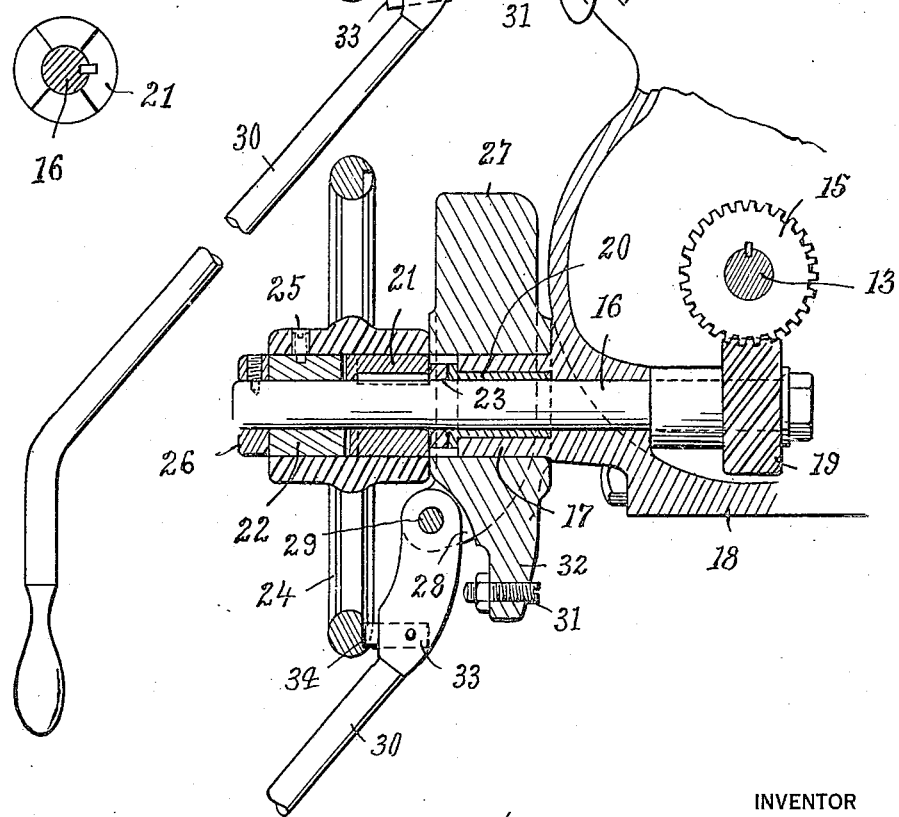
INVENTOR
Edward P. Bullard, Jr.
Chamberlain & Newman
ATTORNEYS

UNITED STATES PATENT OFFICE.

EDWARD P. BULLARD, JR., OF BRIDGEPORT, CONNECTICUT, ASSIGNOR TO THE BULLARD MACHINE TOOL CO., OF BRIDGEPORT, CONNECTICUT, A CORPORATION OF CONNECTICUT.

HAND OPERATING MEANS FOR BORING MILLS.

1,410,450.  Specification of Letters Patent.  Patented Mar. 21, 1922.

Application filed June 3, 1920. Serial No. 386,167.

*To all whom it may concern:*

Be it known that I, EDWARD P. BULLARD, Jr., a citizen of the United States, and resident of Bridgeport, in the county of Fairfield and State of Connecticut, have invented certain new and useful Improvements in Hand Operating Means for Boring Mills, of which the following is a specification.

This invention relates to improvements in machine tools and more especially to boring mills, and has particular reference to hand operating means, for moving the tool-head either vertically or horizontally, in addition to the power mechanism employed for feeding the tool-head in similar directions.

Boring mills of the type referred to, include in part a rotary work carrying table, a cross rail upon which a horizontally movable saddle is slidably mounted, a swivel plate and a down slide upon which a tool-head is carried. Longitudinal feed shafts are mounted in the cross rail for moving the tool-heads both vertically and horizontally and are operated from the same main driving shaft which operates the rotary work carrying table, together with the other parts of the machine. In the regular course of operation of a machine of this type the tool-head is moved forward and backward by one feed shaft, and vertically through the other feed shaft, according to the speed with which the machine is operated.

The purpose of my invention is to provide an independent hand operating mechanism for each of the above shafts whereby their rotary movements may be accelerated or retarded in a way to slightly advance or retard either the horizontal or vertical feeding movements of the tool-head and to so combine these two operations as to produce a combined irregular cutting action for producing special shapes such as are included in tire molds and cones; and finally to provide a wheel and a connectable operating lever for engaging and turning the wheel together with its shaft and the feed shaft, sufficient to move the tool-head in the directions desired.

In the drawings I have shown the invention applied to a Bullard "maxi-mill" type of boring mill such as is shown in our prior Patent #877,403 and for which my novel device has been especially designed, but it will be obviously apparent that the invention may be applied with equal advantage to other types of machines now upon the market.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figs. of the accompanying drawings forming a part of this specification, and upon which, Fig. 1 shows a front elevation of the upper portion of a "maxi-mill" type of boring mill including a rotary table, with two of my improved hand feeding devices applied thereto.

Figure 2:
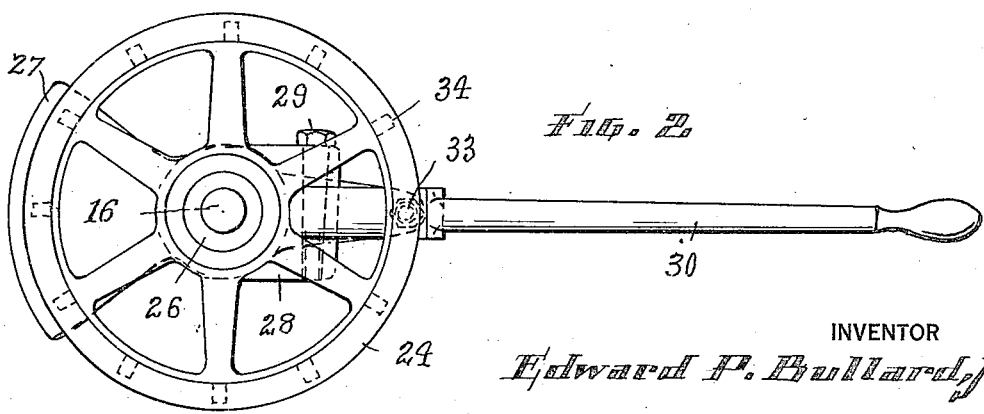

Fig. 2 shows an enlarged front view of one of the said hand feeding devices detached.

Fig. 3 shows an enlarged sectional elevation through the two hand feeding devices shown applied in Fig. 1, the upper portion of the illustration showing a side elevation of one of the feeding devices and the lower part of the fig. illustrating a central vertical sectional view of the other feeding device, and Fig. 4 shows a detached front view of the inner clutch member, mounted on the shaft, and with which the wheel clutch member engages.

Referring in detail to the characters of reference marked upon the drawings, 5 indicates a part of the frame work of a boring mill including uprights having vertical ways 6 upon which the cross rail 7 is adjustably mounted. 8 represents a rotary work table upon which the work is carried, to be operated on by the tools, not shown, carried by the tool-head 9. The tool-head is mounted on the down-slide 10 which in turn is slidably mounted in the swivel plate 11 carried by the saddle 12 mounted to be moved backward and forward upon the cross-rail, through the action of the feed shaft 13 mounted in the cross-rail. The second feed shaft 14 mounted in the cross-rail is connected to raise or lower the down-slide. Both of these shafts are connected to be operated by power, either forward or backward, and either separately or conjointly.

Inasmuch as the particular type of machine to which my invention is shown applied includes two separate feed shafts for the tool-head, it is necessary for me to employ a separate hand-feeding device for each shaft so as to provide separate and independent means for manipulating each shaft. Therefore I have shown in both Figs. 1 and 3 two separate sets of hand feeding mechanism, one for each shaft. These two devices are alike in construction so I shall not need to include herein a detail description of both sets but will apply similar reference numerals to the like parts in the devices.

A spiral gear 15 is mounted on each of the feed shafts 13 and 14 and are adapted to turn therewith in their rotary feeding operations and serves as the medium through which my hand feeding device is connected. Short shafts 16 are mounted in the hubs 17 of the casing 18 and each carries a spiral gear 19 that meshes with the before mentioned spiral gear 15 to operate the same.

A bushing 20 is provided in the hub 17 for each of the shafts which are arranged below the feed shafts and extend forward of and at a right angle to the same. A clutch member 21 is keyed to the shaft 16 and is provided with a clutch face upon one end to be engaged by the clutch face of the co-acting clutch member 22 mounted on the same shaft. The relative size of these clutch teeth and the pockets therebetween is such as to afford a slight independent movement of the wheel and its clutch member, better to insure the desired operation of the shaft. A collar 23 is positioned on the shaft between the bushing 20 and the clutch member 21. The outer clutch member 22 is secured in the hub of the operating wheel 24 by a pin 25 and a collar 26 is secured upon the outer end portion of the shaft 16 against the clutch member 22 to hold the same and its wheel in position.

A hanger 27 is journalled to swing upon the hub 17 of the casing and includes a pair of ears 28 that project from the carrier and serve to support a pin 29 upon which an operating lever 30 is hung. An adjustable stop screw 31 is seated in a lug 32 positioned in the rear of the operating lever. The lever is so hung and positioned as to normally engage the stop 31 and is projected forward and downward so as to be free of all other operative parts of the machine, but is convenient for operating purposes. A pin 33 is positioned in the upper part of the operating lever in position to engage one of the notches 34 in the wheel when the lever is swung forward for that purpose.

In order to operate either of the feed shafts by the above described hand feeding device, it would first be necessary to disengage the power feed and rapid traverse mechanisms so-called but not specially shown herein, which leaves the feed shafts entirely free to be operated by hand feed in the following manner. The operator first engages the handle of the lever, draws it forward so its pin engages one of the notches of the wheel, then by pushing the lever sidewise, the wheel, its clutch and shafts, can readily be turned in a way to turn the feed shaft. After the parts have been adjusted or turned to the extent desired the lever may be disengaged, and allowed to drop back to a vertical position of rest out of the way of all other parts.

Having thus described my invention what I claim and desire to secure by Letters Patent is—

1. A hand operating device for machine tools comprising an operating shaft, an element for rotating the shaft, a hanger mounted to oscillate about said shaft, an operating lever hinged to said hanger at a point spaced from the axis of said shaft and having means to engage the element on the shaft for rotating the same and the shaft.

2. A hand operating device for machine tools comprising an operating shaft, a wheel mounted thereon, a hub in which said shaft is mounted, a hanger journalled to oscillate about said hub, and an operating lever hinged to the hanger at a point spaced from the axis of the shaft and having means to engage the wheel to turn the same and the shaft.

3. An operating device for machine tools comprising an operating shaft, a wheel mounted thereon and having a series of notches in its periphery, a hub in which said shaft is mounted, a hanger journalled around said hub to oscillate thereabout, and an operating lever hinged to the hanger at a point spaced from the axis of the shaft and having means to engage the notches to turn the wheel and shaft, said lever being normally free of said wheel.

4. A hand operating device for machine tools comprising an operating shaft journalled in a fixed part, a clutch member fixed on the shaft, a wheel mounted thereon and including a clutch member to engage the clutch member fixed on the shaft, whereby the wheel may have limited independent movement on the shaft, a hanger journalled about the hub, and an operating lever hingedly depending from the hanger and being free of said wheel, said lever having means to engage the wheel to turn the same and the shaft.

5. A hand operating device for machine tools comprising an operating shaft journalled in a fixed part, a clutch member fixed on the shaft, a wheel mounted thereon and including a clutch member to engage the clutch member fixed on the shaft, whereby the wheel may have limited independent movement on the shaft, a hanger journalled to rotate upon the fixed part, and an operating lever hinged to the hanger at a point spaced from the axis of the shaft, said lever normally hanging free of said wheel but being capable of engaging the same to turn the shaft.

Signed at Bridgeport, in the county of Fairfield and State of Connecticut, this 25th day of May, A. D. 1920.

EDWARD P. BULLARD, Jr.

Witnesses:
W. J. LYNCH,
JOHN E. COTTER.